INVENTOR.
H. W. Schneider,
BY Rule & Hoge
ATTORNEYS.

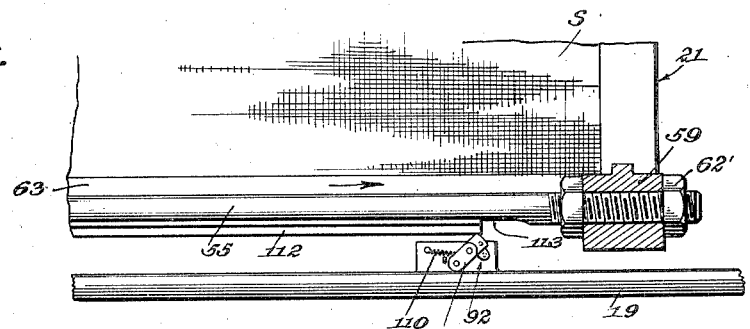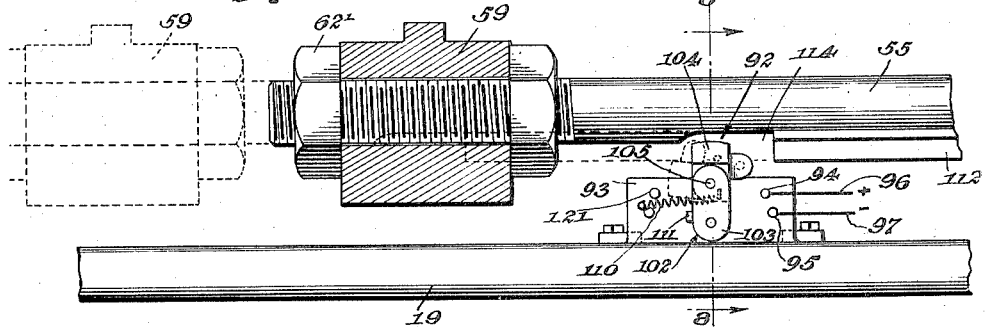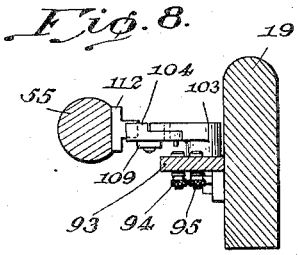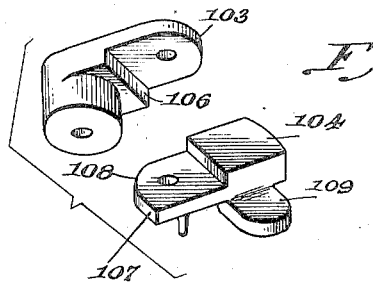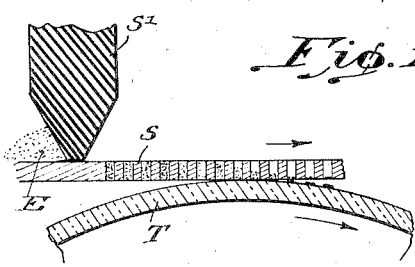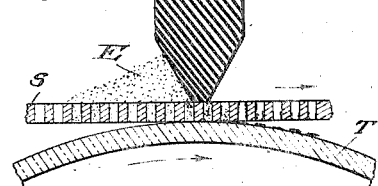

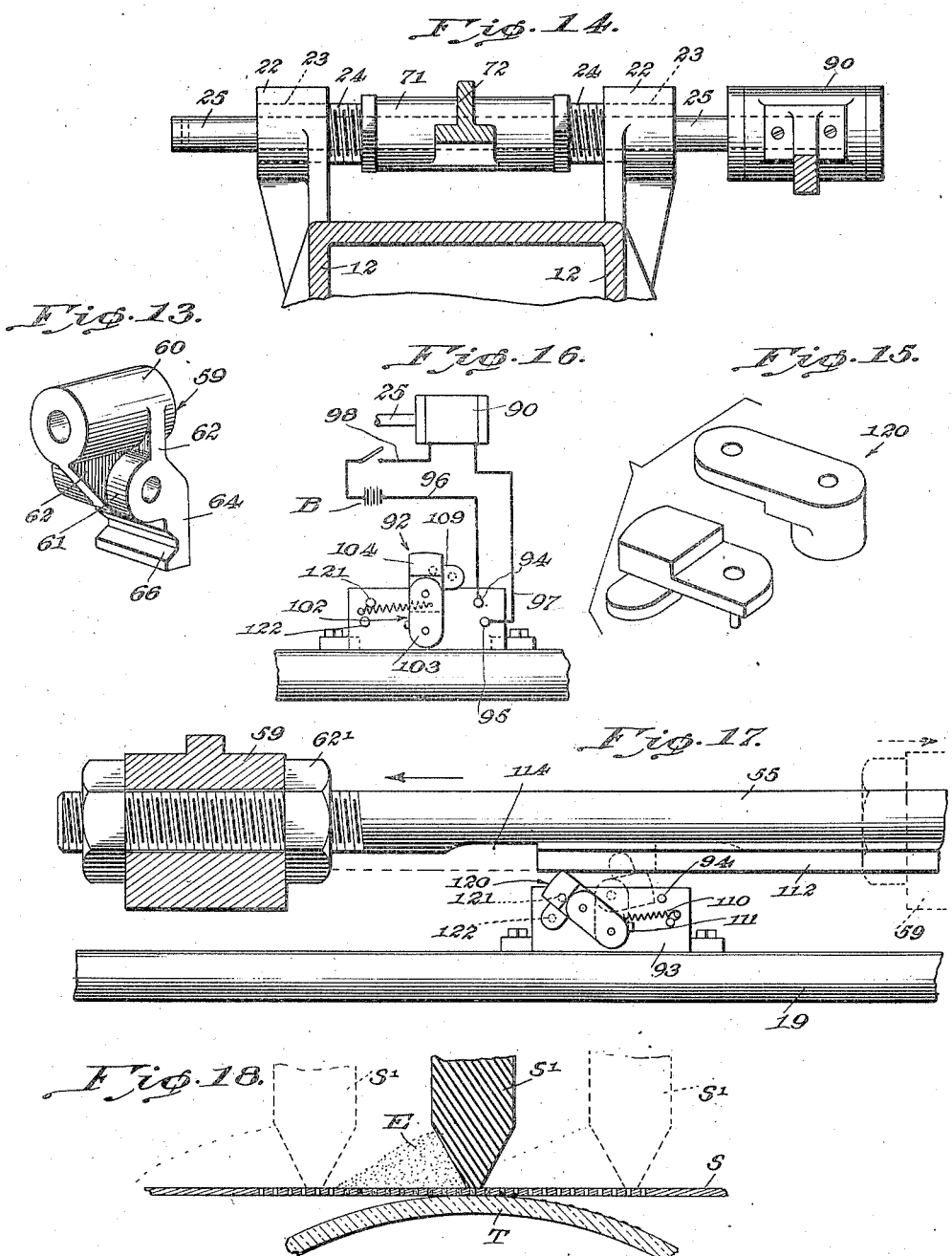

Patented Nov. 7, 1939

2,179,220

UNITED STATES PATENT OFFICE 2,179,220

APPARATUS FOR STENCILING ARTICLES

Henry W. Schneider, Toledo, Ohio, assignor to Libbey Glass Company, a corporation of Ohio Application August 21, 1936, Serial No. 97,241

12 Claims. (Cl. 101—124)

The method of and apparatus for stenciling comprising the present invention is primarily adapted for use in applying a vitreous enamel composition or paint to articles of glassware such as tumblers, jars, bottles and the like, and to other articles of a vitreous or ceramic nature in the lettering or decorating thereof by a stenciling process.

The invention is embodied in an apparatus of the type employing a stencil screen capable of movement relative to the article undergoing decoration and having permeable portions through which the decorating material is transferred to the article by the spreading action of a squeegee.

The principal object of the invention is to provide an apparatus which will generally improve and simplify the operation of applying the vitreous enamel composition to such articles; which will materially increase the quantity of work performed as well as improve the quality and uniformity thereof; and which will lessen the labor and skill otherwise required in performing the same type of stenciling operations.

Another object of the invention is to provide a method of and an apparatus for stenciling wherein the thickness of the design applied to the articles may be varied to control the opacity thereof.

In carrying out the object just mentioned, the invention contemplates the provision of an apparatus for stenciling the curved surfaces of articles wherein a rolling line-contact is maintained between the surface undergoing decoration and the stencil screen, and wherein the enamel composition is applied to the surface through the screen by the spreading action of a squeegee which is adjustable to an off-center position relative to the line of contact maintained between the surface and screen in order that the pervious portions of the screen may traverse or contact the article prior to, simultaneous with, or subsequent to contact with the squeegee. In carrying out this object, the invention contemplates the provision of an automatically operable means for shifting the position of the squeegee so that the squeegee will occupy the same relative off-center position with respect to the line of contact between the screen and the surface of each succeeding article undergoing decoration upon reversal of the movement of the stencil screen.

As an alternative method of varying the thickness, and consequently the opacity of the design applied to the articles, the invention contemplates the use of screens of varying thickness, the capillary and adhesive phenomena of which vary, thus resulting in the application of a matted design, the subdivided units of which vary in their enamel content.

Another object of the invention is to provide an improved article support or carriage by which articles having tapered or inclined sides may be quickly and conveniently positioned in the machine with such surfaces in operative contact with the stencil screen.

Another object of the invention is to provide an automatic trip mechanism for lowering the article support or carriage at the completion of each decorating operation to remove the decorated article from contact with the screen and to facilitate substitution of an undecorated article in the machine.

Another object of the invention is to provide an automatic means for elevating the squeegee from the stencil screen at the completion of each decorating operation just prior to movement of the screen to one of its extreme positions to permit shifting of the position of the squeegee from one off-center position to another.

Other objects and advantages of the invention will appear hereinafter.

In the accompanying drawings:

Fig. 6 is a fragmentary plan view, partly in section, of a portion of a screen frame and track therefor illustrating the operation of an automatic circuit maker and breaker employed in connection with the present invention.

Fig. 7 is an enlarged fragmentary plan view similar to Fig. 6 showing the parts thereof in another position.

Fig. 8 is a sectional view taken substantially along the line 8—8 of Fig. 7.

Fig. 9 is a perspective view of the individual pieces of a two-part trip member employed in connection with the present invention.

Fig. 11 is a sectional view similar to Fig. 10 showing the squeegee in an off-center position on the other side of the line of contact between the screen and article.

Fig. 12 is a sectional view similar to Fig. 10 showing the squeegee centered upon the line of contact between the screen and article.

Fig. 13 is an enlarged perspective view of a corner fastening employed in connection with the present invention.

Fig. 14 is a fragmentary side elevational view of a portion of the apparatus showing a rockable squeegee holding arm centered in the apparatus.

Fig. 15 is a perspective view similar to Fig. 9, showing a modified form of two-part trip member designed for substitution in the apparatus.

Fig. 16 is a diagrammatic view of the electrical circuit employed for shifting the squeegee from an off-center position on one side of the line of contact between the stencil screen and article to a corresponding off-center position on the other side thereof.

Fig. 17 is a fragmentary plan view of a switch assembly in which the trip member shown in Fig. 15 is incorporated, and Fig. 18 is a sectional view similar to Figs. 10, 11 and 12, showing a screen of different thickness applied to the article undergoing decoration.

Figure 1:
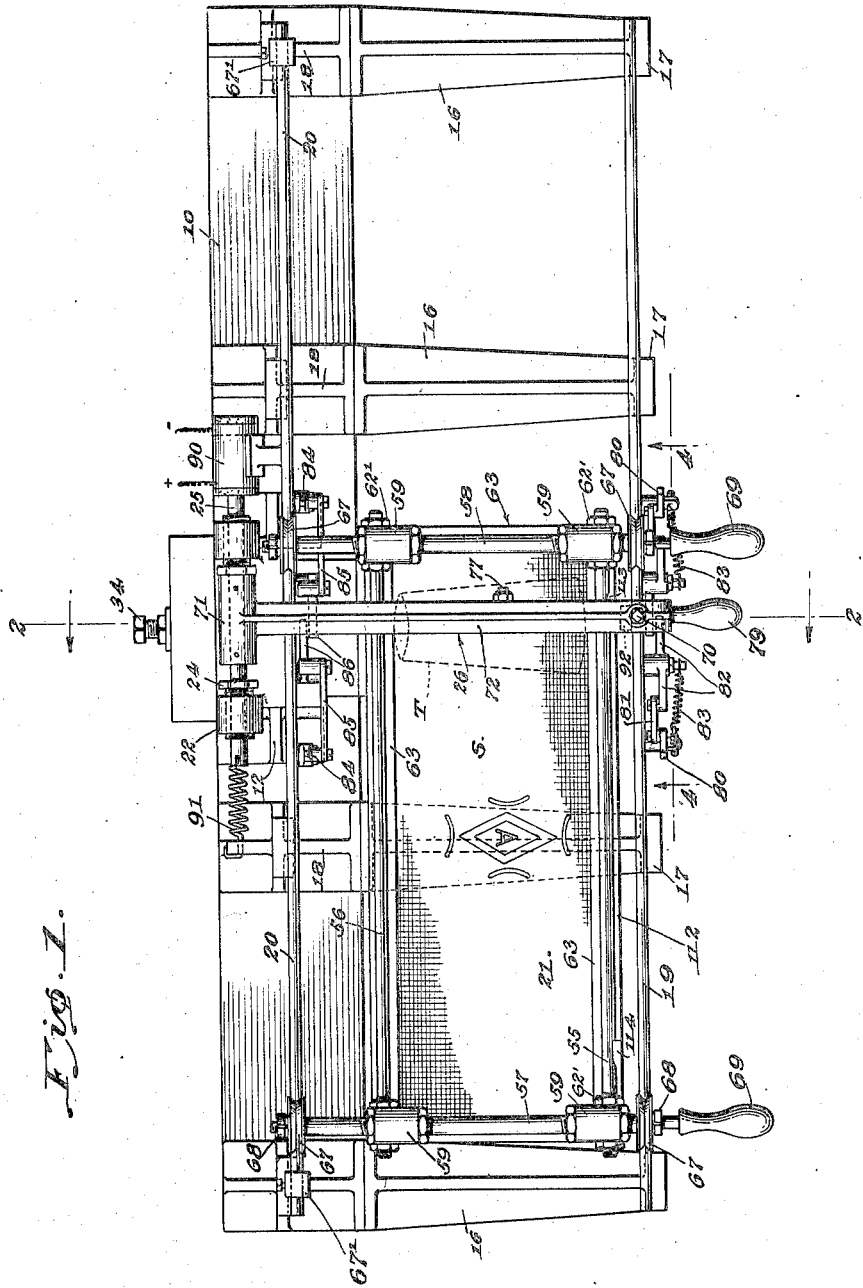
Fig. 1 is a top plan view of a stenciling apparatus manufactured in accordance with the principles of the present invention.

The apparatus involves in its general organization a base 10 in the form of an elongated, substantially rectangular castings provided with a recess 11 in the forward side thereof medially of its ends. Bolted or otherwise secured to the base 10 on opposite sides of the recess 11, and extending vertically upward therefrom, are a pair of standards or supports 12 (Fig. 3) having integrally formed aligned bearings 13 medially of their ends which serve to support therebetween a horizontal rock-shaft 14. An article-supporting assembly 15 (Figs. 2, 3 and 5) is pivotally mounted on the rock-shaft 14 and is designed to support thereon a tumbler T or like article to be decorated.

A plurality of supporting members 16 (Figs. 1 and 3), each having a forwardly and upwardly extending supporting arm 17 and a vertically extending arm 18, are bolted or otherwise secured to the base 10 at spaced points therealong. Two of these supporting members occupy positions at the extreme ends of the base 10 while the remaining two members occupy respective medial positions on the opposite sides of the center thereof. A pair of front and rear transversely extending horizontal tracks 19 and 20 respectively, are carried by the supporting arms 17 and 18 and are substantially coextensive with the base 10. Supported upon the tracks 19 and 20 and movable therealong transversely of the apparatus, is a stencil screen assembly 21 having associated therewith a stencil screen S adapted to occupy a position in the apparatus in tangential rolling line-contact with the article T supported thereunderneath.

The upper ends of the standards 12 are provided with integral guides 22 (Fig. 3) having axially aligned threaded bores 23, in which bores there are threadedly received a pair of adjustable sleeves 24. A transversely extending rock-shaft 25 is rockably supported between the sleeves 24 and is axially slidable therein. A squeegee assembly 26 (Fig. 5), including a squeegee S', is secured to the shaft 25 and is rockable therewith while at the same time being capable of lateral shifting upon sliding movement of the shaft 25 in the sleeves 24. The squeegee S' is adapted to force decorating material placed upon the screen S through the same and onto the article undergoing decoration. The squeegee is normally held in position above the article in contact with the screen S along the line of contact between the surface of the article undergoing decoration and the screen or along a line off-set from the line of contact on either side thereof as will be fully described hereinafter.

Figure 2:
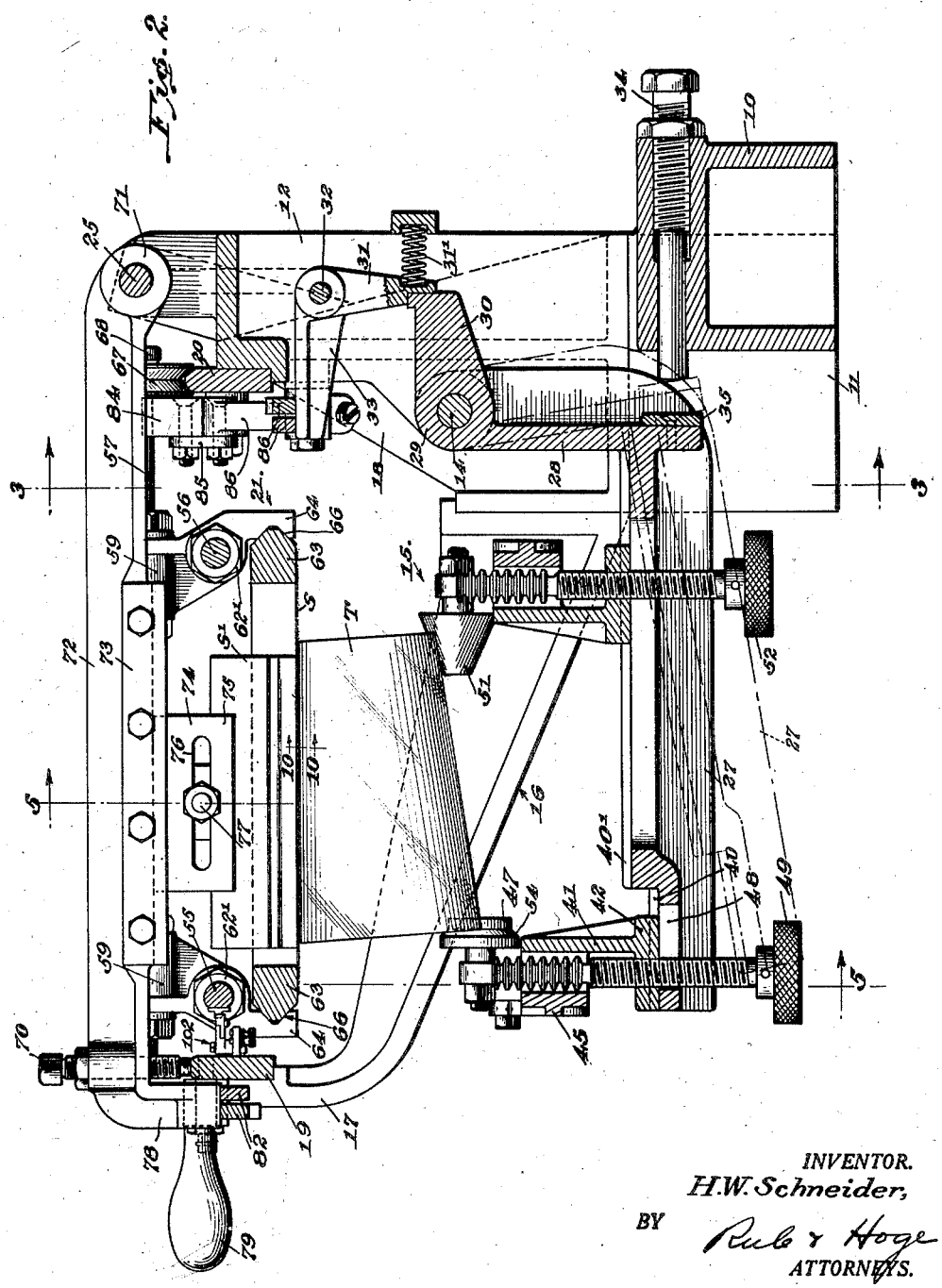
Fig. 2 is a sectional view taken substantially along the line 2—2 of Fig. 1.
Figure 5:
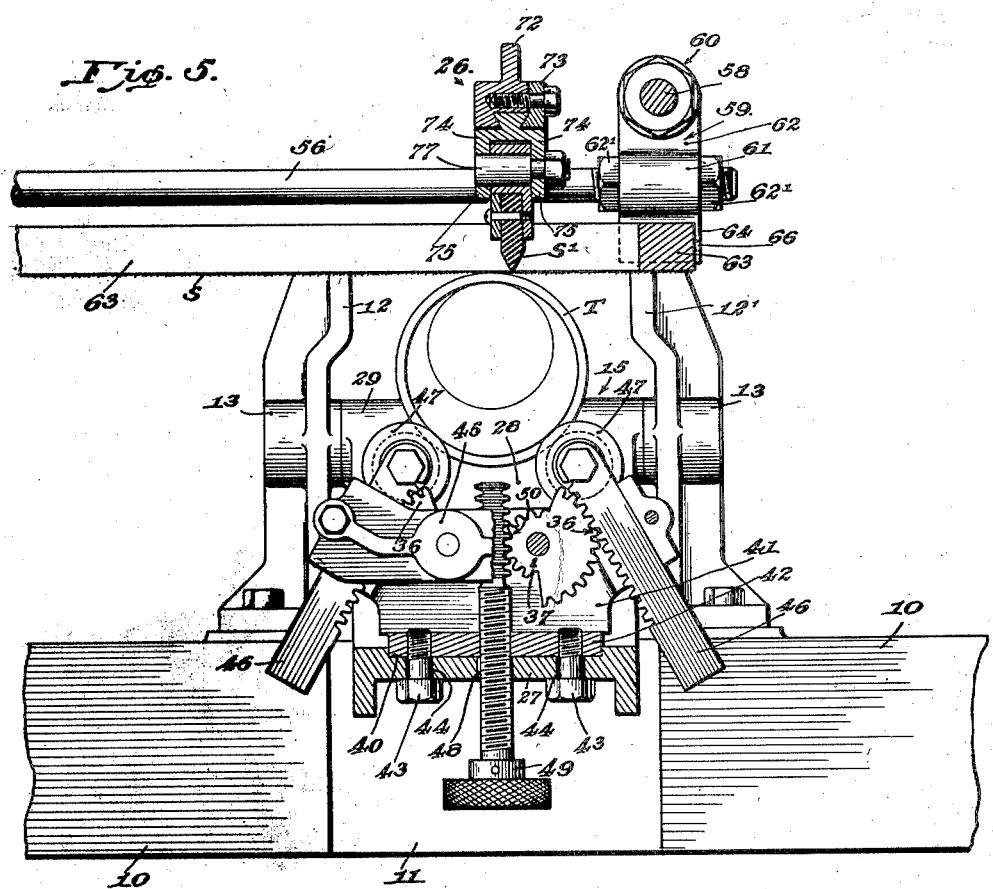
Fig. 5 is a sectional view taken substantially along the line 5—5 of Fig. 2.

Referring now to Figs. 2 and 5, the article supporting assembly 15 is shown in detail, and includes a carriage in the form of a base plate 27 having an upwardly extending portion 28 (Fig. 2) at the rear thereof. An integral sleeve 29 is formed on the portion 28 in axial alignment with the bearings 13. The base plate 27 is rockably supported on the shaft 14 which extends through the bearings 13 and sleeve 29 (Fig. 5). A latch engaging arm 30 (Fig. 2) projects rearwardly from the sleeve 29 and is adapted to be engaged by a depending spring pressed latch 31 pivotally mounted on a rock-shaft 32 supported between the standards 12. In the latch engaging position of the arm 30, the carriage 27 is supported in a horizontal position in the apparatus. A forwardly extending latch operating arm 33 is integrally formed on the latch 31 and is adapted to be depressed upon movement of the stencil screen assembly 21 to one or the other of its limiting positions in a manner subsequently to be described to cause the latch 31 to be moved out of the path of the arm 30 to permit the carriage 27 to drop by gravity to the broken line position shown in Fig. 2.

In order to adjustably limit the downward movement of the carriage 27, an adjusting screw 34, threadedly received in the base 10, projects forwardly into the slot 11 and engages an abutment 35 suitably secured to the rear edge of the carriage.

The base plate 27 of the carriage is provided with a longitudinally extending shallow groove 40. A front article supporting bracket 41 is provided with a base 42 which is slidably disposed in the groove 40 for longitudinal adjustment on the base plate 27 and is adapted to be clamped in any desired adjusted longitudinal position by means of clamping bolts 43 (Fig. 5) extending through longitudinal slots 44 provided in the base plate 27. An offset bracket plate 45 (Fig. 2) is bolted adjacent its ends to the upper portion of the bracket 41 and has its medial portions spaced from the body of the same. A pair of upwardly extending inclined toothed racks 46 (Fig. 5) carrying article-supporting rollers 47 at their upper ends are slidably mounted between the body of the bracket 41 and the bracket plate 45 and are adapted to be moved bodily in their respective inclined planes by means of toothed sectors 36 which are integrally formed on a pair of pinions 37 pivotally mounted between the bracket 41 and the bracket plate 45. A longitudinal slot 48 (Fig. 2) is formed in the base plate 27. An adjusting screw 49 extends through the slot 48 and base 42 and is in threaded engagement with the latter. The upper end of the adjusting screw 49 is in threaded engagement with a second pair of toothed sectors 50 (Fig. 5) provided on the respective pinions 37. The lower end of the adjusting screw 49 projects below the base plate 27 and is readily accessible to the operator of the apparatus. Thus it will be seen that turning movement of the adjusting screw 49 in one direction or the other will serve to elevate or lower the racks 46 and rollers 47 to raise or lower the rim or upper end of the tumbler T in order that proper adjustment thereof in the application of the tumbler to the screen may be effected.

The base portion of the tumbler T is supported upon rollers 51 (Fig. 2) which are adjustable in respective inclined planes by means of an adjusting screw 52 forming part of a pinion and rack assembly which is substantially identical with the assembly just described for elevating or lowering the rim end of the tumbler, and which similarly is slidably disposed in a shallow groove 40' provided on the base plate 27.

The rollers 47 are flanged as at 54 to prevent the tumbler T from creeping forwardly on the supporting rollers 47 and 51 due to gravitational end thrust. When the tumbler is properly positioned in the apparatus, the rollers 47 occupy a position below the plane of the rollers 51 a sufficient distance to permit the tapered surface of the tumbler to make tangential line-contact with the lower side of the screen S.

Referring now to Figs. 1, 13 and 17, the stencil screen assembly 21 consists of a carriage including parallel front and rear bars 55 and 56 respectively, and parallel side bars 57 and 58. The bars 55 and 56 are secured to the bars 57 and 58 by means of corner fastenings 59, one of which is shown in Fig. 13. Each corner fastening consists of a casting in the form of an upper sleeve 60 and a lower sleeve 61 connected together by means of webs 62. The axes of the sleeves 60 and 61 extend at right angles to each other. The ends of the front and rear bars 55 and 56 are threaded and extend through the lower sleeves 61 of the respective corner fastenings 59 and are secured therein against axial shifting by means of suitable nuts 62'. Similarly, the ends of the side bars 57 and 58 are received and secured in the upper sleeves 60 of the respective corner fastenings 59, the whole assembly cooperating to form a rigid rectangular frame-like structure.

A stencil screen frame 63 (Figs. 1 and 2) of rectangular formation is suspended beneath the carriage 21 by means of depending clamping arms 64 (Fig. 13) which are integrally formed on the sleeves 61 of the corner fastenings 59. These clamping arms 64 are grooved as at 66, the grooves of adjacent corner fastenings at each side of the carriage 21 opposing each other. The sides of the rectangular screen frame 63 are received in the opposed grooves 66 at each side of the carriage 21. The stencil screen S is secured to the underneath side of the frame 63 in any suitable manner, as for example by the application of a glue along the lower edges thereof. A pair of limit stops 67' (Fig. 1) are positioned, one at each end of the rear track 20 and are adjustable therealong to vary the extent or amplitude of reciprocation of the carriage 21.

The ends of the bars 57 and 58 project forwardly and rearwardly beyond the confines of the rectangular frame and each end thereof has mounted thereon a grooved supporting wheel 67 (Fig. 1) which is held in position by means of a spanner nut 68. The wheels 67 are tractionally supported on the tracks 19 and 20. In order that the carriage 21 may be reciprocated manually by the operator of the apparatus, the forward ends of the bars 57 and 58 are provided with handles 69. By manually engaging the handles 69, the operator is enabled to move the carriage 21 from the extreme position shown in Fig. 1 to a corresponding position at the other side of the apparatus and vice versa. During such reciprocation of the carriage, the screen tractionally engages the tumbler T supported therebeneath and, by a rolling contact therewith, causes the same to be rotated on the supporting rollers 47 and 51.

The squeegee assembly 26 (Fig. 1) which is rockably supported on the rock-shaft 25 consists of a sleeve 71 suitably secured to the slidable rock-shaft. A squeegee arm 72 projects forwardly from the sleeve 71 and overlies the tracks 19 and 20. A squeegee holder 74 (Fig. 2) is secured medially to the squeegee arm 72 and is adjustable axially therealong by means of a clamping plate 73 (Fig. 5). The holder 74 is provided with a pair of depending spaced parallel flanges 75 which are slotted as at 76 and between which flanges the squeegee proper S' is suspended for limited rocking movement, by means of a pin 77 which is adjustably supported in the slots 76. The squeegee S' is thus capable of axial adjustment for proper alignment with the decoration of the screen S.

The squeegee arm 72 extends over the front track 19 and the extreme end 78 thereof extends downwardly (Fig. 2) in close proximity to the track 19. A handle 79 is secured to the downwardly extending portion of the arm 72 and projects forwardly within convenient reach of the operator.

In order to adjust the squeegee S' (Fig. 2) to the screen S, an adjusting screw 70, extending through the outer end of the arm 72, engages the front track 19 and carries the entire weight of the forward end of the squeegee assembly. Turning movement of the adjusting screw 70 in one direction or the other causes elevation or lowering of the squeegee from and to the screen S.

Figure 4:
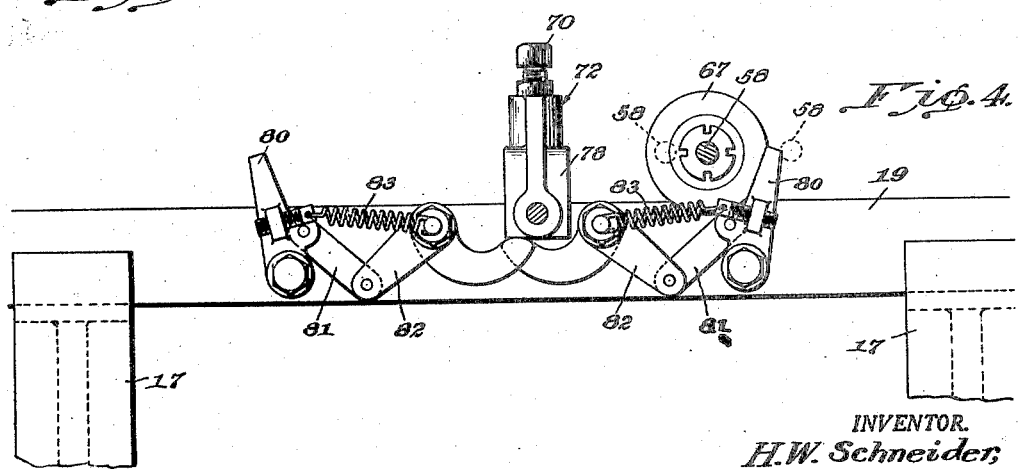
Fig. 4 is a sectional view taken substantially along the line 4—4 of Fig. 1.

Referring now to Fig. 4, an automatic trip mechanism for momentarily elveating the squeegee S' from the stencil screen S is shown. The trip mechanism is adapted to function after the complete design has been applied to the tumbler T but prior to movement of the carriage 21 to either of its limiting positions. Such momentary elevation of the squeegee S' permits the enamel composition on the screen to pass under the squeegee and occupy a position ahead of the squeegee during the return stroke of the carriage in order that proper application of the design may be made to the next succeeding tumbler undergoing decoration.

Pivoted to the stationary front track 19 in the vicinity of the squeegee arm 72 and on opposite sides thereof, are a pair of fingers 80 which normally extend upwardly into the path of the carriage 21 and which are adapted to be engaged by the extreme ends of the side bars 57 and 58 respectively upon approach of the carriage 21 to cne or the other of its limiting positions. Each of the fingers 80 is connected through links 81 to one arm of a bell crank lever 82. The other arm of the bell crank lever is conveniently curved for engagement with the underneath side of the downwardly turned end 78 of the squeegee arm 72.

It will be seen that inward swinging movement of either of the fingers 80 toward the squeegee arm 72 will transmit motion through the respective links 81 and bell crank levers 82 in such a manner as to elevate the arm 72 slightly to permit the squeegee S' to clear the screen S. Each of the fingers 80 is maintained in its upwardly projecting position by means of a coil spring 83 connected at one end to some stationary point on the track 19, and at the other end to a medial point on one of the fingers 80. The tension of the springs 83 is insufficient to raise the squeegee arm 72 from its supported position on the track 19.

Upon completion of the decorating operation (i. e. after the complete design has been applied to the tumbler T), and as the carriage approaches the end of its stroke at either end of the track 19, the forward end of the shaft 57 or 58, as the case may be, passes completely over the respective finger 80 and in so doing tilts the finger inwardly to momentarily raise the squeegee assembly in the manner previously described. Upon passing beyond the radial limits of the finger 80 to the dotted line position shown in Fig. 4, the end of the shaft 58 releases the finger 80 which is immediately returned to its upright position thus permitting the squeegee to return by gravity to screen engaging position. Upon commencement of the next succeeding decorating operation, as the carriage 21 is moved in the reverse direction, the end of the shaft 58 trips lightly over the finger with no significant effect other than to permit the carriage to continue its unobstructed movement on the tracks 19 and 20.

Figure 3:
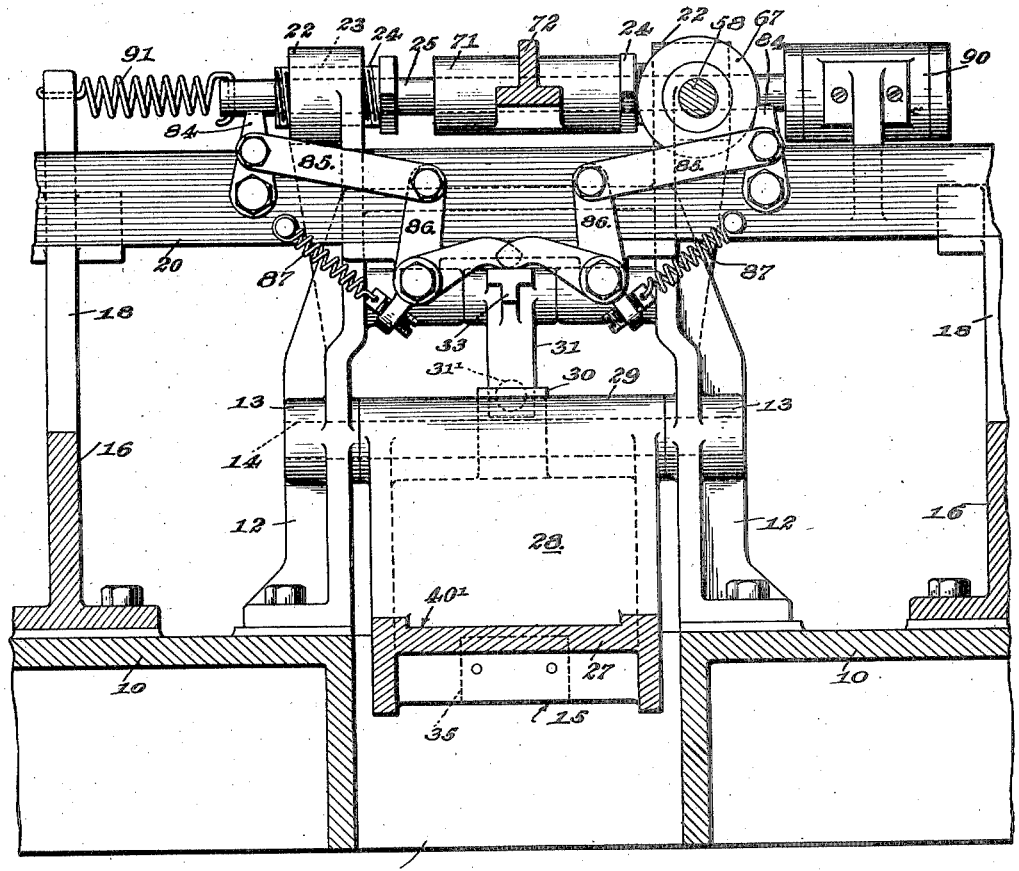
Fig. 3 is a sectional view taken substantially along the line 3—3 of Fig. 2.

Referring now to Figs. 1, 2 and 3, an automatic trip mechanism for releasing the article holding carriage or base plate 27 to permit the same to drop from its horizontal position is shown. The trip mechanism is adapted to function after the decoration has been applied to the tumbler as the carriage 21 approaches one or the other of its limiting positions. Upon release of the carriage 27 the broken line position shown in Fig. 2 is assumed thereby, the tumbler T is exposed, and substitution of an undecorated tumbler in its stead is thus facilitated.

Pivoted to the stationary rear track 20 in the vicinity of the squeegee arm 72 and on opposite sides thereof are a pair of fingers 84 which normally extend upwardly into the path of the carriage 21 and are adapted to be engaged by the side bars 57 and 58 respectively upon approach of the carriage 21 to one or the other of its limiting positions. Each of the fingers 84 is connected through links 85 to one arm of a bell crank lever 86. The other arm of the bell crank lever is curved for engagement with the upper side of the latch operating arm 33. Thus inward swinging movement of either of the fingers 84 will transmit motion through the respective links 85 and bell crank levers 86 in such a manner as to depress the latch operated arm 33 and cause the latch 31 to be moved out of the path of the latch engaging arm 30 to permit the carriage 27 to drop by the action of gravity to the position shown in broken lines in Fig. 2.

The bell crank levers 86 (Figs. 2 and 3) are normally urged into engagement with the arm 33 by the action of respective coil springs 87, the capacity of which is insufficient to cause tripping of the latch 31. The latch is normally held in the path of the latch-engaging arm 30 by means of a spring 31' and thus, the effect of this spring is transmitted through the lever 86 and link 85 to restore the fingers 84 to their upright position after the latch 31 has been tripped.

Upon commencement of each decorating operation, as the screen carriage 21 is moved from its initial position at either end of the tracks 19 and 20, the bar 57 or 58, as the case may be, lightly trips over its respective finger 84 which is immediately restored to its upright position. Such tripping of the fingers 84 is without significance and the carriage 27 remains undisturbed until the decoration is applied and the screen carriage 21 approaches one of its limiting positions.

Referring now to Fig. 12, the squeegee S' is shown as being centered upon the article or tumbler T in such a manner that, during the decorating operation, the stencil screen S passes between and contacts the article and squeegee simultaneously and at opposed points. In this position of the squeegee S' the adjustable sleeves 24 (Fig. 14) are threadedly supported in the guides 22 and in such a manner that the squeegee arm 72 is centered between the standards 12. The ends of the sleeves 24 abut against the sleeve 71 and prevent lateral shifting of the squeegee arm 72.

During the decoration of the tumblers T, with the squeegee thus centered thereon, and with the screen moving in the direction indicated by the arrow in Fig. 12, the enamel composition, designated at E, is carried ahead of the squeegee in the form of a pool or puddle underneath which the screen passes. As the individual interstices of the pervious portion of the screen pass under the pool of enamel, they become filled immediately prior to their passage between the screen and squeegee. Since the squeegee bears against the screen with considerable pressure, the enamel is forced against the surface of the tumbler, thus effecting a relatively highly degree of molecular contact between the glass surface and the particles of enamel. As a result thereof, a high degree of adhesion between the enamel particles and glass is effected which, upon separation of the screen and glass surface along the line of contact therebetween, causes the enamel to be drawn from the interstices of the screen against the capillary tendency of the enamel to remain within the interstices and to be deposited on the glass. Because of the constant factors involved, including the relatively high coefficient of adhesion between the glass surface and the particles of enamel, as compared to the relatively low coefficient of adhesion between the rubber squeegee and the particles of enamel, and the constant pressure applied by the squeegee to the screen, a constant and uniform quantity of enamel is deposited on the surface of the article. Inasmuch as the squeegee closes or blocks off the tops of the individual interstices at the precise moment they deposit their contents on the glass surface, the quantity of enamel deposited on the surface is substantially the equivalent of the amount of enamel capable of entering the interstices of the screen at one filling thereof. In other words the thickness of the enamel coating applied to the surface is at least largely determined by the thickness of the screen.

Figure 10:
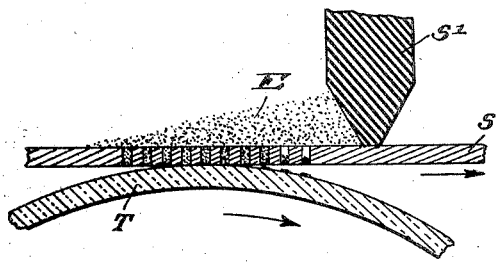
Fig. 10 is an enlarged sectional view taken substantially along the line 10—10 of Fig. 2, showing the squeegee in an off-center position on one side of the line of contact between the squeegee and article undergoing decoration.

Referring now to Fig. 10, the squeegee is shown as occupying on off-center position in contact with the screen on one side of the line of contact between the article and screen. In the position shown, the squeegee occupies a position behind the line of contact in such a manner that the pervious portions of the screen progressively contact the surface of the article before contacting the squeegee. Under such conditions of stenciling, it has been found that a relatively heavy deposition of enamel composition on the surface of the article results. Consequently this method of decoration has been found useful in the application of relatively translucent colors such as white, yellow or the like to the article. This heavy deposition is due to the accumulation or piling up of the enamel in the vicinity of the squeegee on the tumbler side thereof in such a manner that in addition to the phenomena of adhesion between the enamel and the glass surface and of cohesion between the molecules of enamel themselves, which tends to overcome the capillary tendency of the enamel to remain within the interstices of the mesh screen, there is the weight of accumulated enamel above the stencil screen which is a contributing factor toward this relatively heavy deposition of enamel on the glass surface. In addition to this, apart from the downward force exerted by the mass of accumulated enamel, this mass provides a large reserve of enamel above the screen that does not become exhausted when the enamel is pulled from the interstices of the screen by the surface tension phenomena above referred to.

In order to permit the squeegee to be moved to an off-center position, the rock-shaft 25 (Figs. 1 and 3) is capable of axial shifting within the supporting sleeves 24. The sleeves 24 are adjusted so that the inner opposed faces thereof occupy predetermined positions that are equally distant from the vertical plane which passes through the line of contact between the screen S and the article T. Upon axial reciprocation of the shaft 25, the sleeve 71 carrying the squeegee arm 72 is caused to reciprocate within limits determined by the position of the sleeves 24. Thus the squeegee is shifted from an off-center position on one side of the line of contact between the article and screen to a corresponding off-center position of equal amplitude on the other side thereof.

Still referring to Figs. 1 and 3, in order to shift the position of the shaft 25, one end thereof extends into the magnetic field of an electromagnet 90 and forms the movable core thereof. Upon energizing the magnet 90, the entire rock-shaft 25 is moved to the position shown in Fig. 3 and is maintained in such off-center position as long as the magnet 90 remains energized. Upon deenergizing the magnet 90, a coil spring 91, Fig. 3 shifts the rock-shaft 25 to the other corresponding off-center position.

In order to energize the magnet 90 (Figs. 1 and 16) and maintain the squeegee in a position behind the line of contact between the article and screen, a switch assembly 92 is provided for automatically closing a circuit through the windings of the electromagnet 90. The switch assembly 92 consists of a plate 93 bolted or otherwise secured to the forward track 19 in the vicinity of the squeegee arm 72. A pair of contacts 94 and 95 are provided on the plate 93, the former being connected by a lead 96 to one terminal of a battery B or other source of electric current and the latter being connected by a lead 97 to one terminal of the electromagnet 90. The remaining terminal of the electromagnet is connected by a lead 98 to the remaining terminal of the battery B. It is obvious that closing of the circuit by electrically connecting the contacts 94 and 95 will energize the electromagnet to actuate the rock-shaft 25 in the manner previously described.

Referring now to Figs. 6, 7, 8 and 9, the plate 93 has pivoted thereto a two-piece trip member 102 comprising an inner piece 103 formed of an insulating material and an outer piece 104 formed of a conducting material. The pieces 103 and 104 are pivoted together as at 105. A shoulder 106 formed on the piece 103 engages an end 107 of the piece 104 and limits the extent of pivotal movement of the piece 104 on the piece 103 in one direction. Pivotal movement of the piece 104 on the piece 103 is made possible by means of a rounded portion 108 provided on the end 107. An ear 109, formed on the piece 104, serves as a switch element to electrically connect the contacts 94 and 95 upon pivotal movement of the entire two-piece trip member 102 to the position shown in Fig. 6. A spring 110, connected at one end to the piece 104, and at the other end to the plate 93 normally urges the member 102 into an outwardly projecting position in engagement with a stop 111 as shown in full lines in Fig. 7.

Referring to Fig. 6, the front bar 55 of the carriage 21 is provided with an elongated cam track 112 which is substantially coextensive with the bar 55 but which terminates short of both ends thereof. The bar 55 is provided with cutaway portions 113 and 114 beyond the ends of the cam track 112 into one or the other of which cutaway portions the two-piece member 102 is adapted to extend when the carriage is in either of its limiting positions at the end of its stroke.

In Fig. 6 the carriage 21 is illustrated as having just commenced its stroke in the direction of the arrow. The two-piece trip member 102 which projects into the path of the cam track 112, is engaged by the cam track and the entire unit 102 is swung about the pivotal axis thereof to the position shown in this figure with the ear 109 electrically connecting the contacts 94 and 95. During the major portion of the stroke of the carriage 21, the windings of the electromagnet 90 are thus energized and the rock-shaft 25 is held in the position shown in Figs. 1, 3 and 4 with the squeegee S' occupying the off-center position in contact with the screen S as shown in Fig. 10.

When the carriage 21 reaches the end of its stroke in the direction of the arrow in Fig. 6, it assumes the position shown in Fig. 7. At the completion of the stroke of the carriage, the pivoted trip member 102 is released by the cam track 112 and, under the action of the spring 110, is projected into the slot 114, thus electrically disconnecting the contacts 94 and 95 and deenergizing the electromagnet 90. Under the action of the spring 91 (Fig. 3) the position of the rock-shaft 25 is shifted simultaneously with the momentary elevation of the squeegee S' in the manner previously described. Thus the squeegee is returned to the stencil screen at the extreme end thereof in an off-center position with the enamel composition thereon occupying a position ahead of the squeegee prior to the next movement of the carriage 21 in the opposite direction.

Referring now to Fig. 11, the squeegee S' is shown as occupying an off-center position in contact with the screen S ahead of the line of contact between the article and screen, i. e. in such a manner that the stencil screen S contacts the squeegee before contacting the article. Decoration under such circumstances results in a relatively light but uniform deposition of enamel composition on the surface of the article. Consequently this method of decoration has been found useful in the application of relatively opaque colors such as black, dark blue or the like to the article. The relatively light deposition of vitreous enamel formed on the article is due to the fact that the squeegee in clearing the upper surface of the screen before the screen contacts the glass surface leaves the interstices of the screen filled with the precise amount of enamel that has been forced into them by the squeegee with no reserve of enamel on top of the screen. Ordinarily, this quantity of enamel, if all deposited on the surface of the tumbler would result in a relatively heavy deposition. However, opposing the tendency of the enamel to be withdrawn or pulled from the interstices by the phenomena of adhesion between the enamel particles and glass surface, and cohesion between the particles of enamel themselves, is the capillary tendency of the particles to remain within the interstices. Thus a very small quantity of enamel is released for deposition on the glass.

In order to shift the squeegee to its advanced off-center position ahead of the line of contact between the article and screen immediately prior to the commencement of each decorating stroke of the carriage 21, the switch assembly 92 is modified by removing the two-piece trip member 102 shown in Fig. 9 and substituting in its stead a similar member 120 shown in Fig. 15 while at the same time shifting the position of the spring 110 to the position shown in Fig. 17. A pair of contacts 121 and 122 are provided on the plate 93 of the switch assembly 102 and are electrically connected to the leads 96 and 97. Upon establishing electrical contact between the contacts 121 and 122 the circuit shown in Fig. 16 and previously referred to, will become closed to energize the electromagnet and shift the squeegee in the manner described to its off-center position ahead of the line of contact between the article and screen. The two-piece trip member 120 bears the same relation to the contacts 121 and 122 that the member 102 bears to the contacts 94 and 95. Upon movement of the carriage 21 in the direction indicated by the arrow in Fig. 17 with the member 120 substituted for the member 102, the cam track 112 will engage the member 120 and move the same into contact engaging position as shown in full lines.

Subsequent movement of the carriage 21 in the opposite direction will cause the member 120 to be shifted to its dotted line position to disconnect the contacts 121 and 122 and deenergize the magnet 90 and permit the spring 91 to shift the rockshaft 25 (Fig. 3) and bring the squeegee to its corresponding off-center position prior to reversal of movement of the carriage in the opposite direction.

The quantity of enamel deposited in the surface of the articles may be varied by employing screens of varying thickness. It has been found that, other things being equal, screens of relatively small thickness will deposit a lesser amount of enamel composition on the surface of the article than screens of comparative greater thickness. The relatively small deposit of enamel effected by a screen of small thickness is illustrated in Fig. 18. This phenomenon is attributed to the smaller capacity of the individual interstices in the case of a relatively thin screen as compared to a thicker screen. The phenomenon is evident regardless of whether the squeegee is centered upon the article as shown in full lines or whether the squeegee occupies an offset position with respect to the line of contact between the article and screen as shown in dotted lines.

The thickness of the screen employed may be varied in the application of different colored designs or in the application of a design made up of different component colors in order that a uniform opacity of the completed design may be obtained. For example, if the design consists of light colored floral units accompanied by dark colored foliage, the floral units may be applied to the article with a screen, the thickness of which ranges from .006 inch to .010 inch, while the foliage may be applied with a screen the thickness of which ranges from .002 inch to .004 inch, the exact thickness being determined by the relative opacity of the colors employed.

Modifications may be resorted to within the spirit and scope of the appended claims.

I claim:

1. In an apparatus for decorating articles having cylindrical or frusto-conical surfaces, a stencil screen, means for positioning an article with the surface thereof to be decorated in tangential rolling line-contact with said screen, a squeegee in contact with said screen, said squeegee occupying an off-center position on one side of the line of contact between said screen and surface, and means for shifting said squeegee from its off-center position to a corresponding off-center position on the other side of said line of contact.

2. In an apparatus for decorating articles having cylindrical or frusto-conical surfaces, a stencil screen, means for positioning an article with the surface thereof to be decorated in tangential rolling line-contact with said screen, a squeegee in contact with said screen, said squeegee occupying an off-center position on one side of the line of contact between said screen and surface, and means for automatically shifting said squeegee from its off-center position to a corresponding off-center position on the other side of said line of contact upon movement of said screen in one direction.

3. In an apparatus for decorating articles having cylindrical or frusto-conical surfaces, a reciprocating stencil screen, means for positioning an article with the surface thereof to be decorated in tangential rolling line-contact with said screen, a squeegee in contact with said screen, said squeegee occupying an off-center position on one side of the line of contact between said screen and surface, said squeegee being movable from its off-center position to a corresponding off-center position on the other side of said line of contact, and means synchronized with the reciprocation of said screen for reciprocating said squeegee from one off-center position to the other.

4. In an apparatus for decorating tumblers, a reciprocating stencil screen, means for positioning a tumbler in tangential rolling line-contact with said screen, a shiftable squeegee movable from a position in contact with said screen on one side of the line of contact between said screen and tumbler to a corresponding position on the other side of said line of contact, and means operable upon reciprocation of said screen for shifting said squeegee.

5. In an apparatus for decorating tumblers, a reciprocating stencil screen, means for positioning a tumbler in tangential rolling line-contact with said screen, and a squeegee in contact with said screen on one side of a plane perpendicular to the screen and passing through the line of contact between said screen and tumbler.

6. In an apparatus for decorating tumblers, a reciprocating stencil screen, means for positioning a tumbler in tangential rolling line-contact with said screen, a shiftable squeegee in contact with said screen, means normally holding said squeegee in an off-center position on one side of the line of contact between said screen and tumbler, and an electromagnet for shifting the position of said squeegee to an off-center position on the other side of said line of contact.

7. A stenciling apparatus comprising a stencil screen frame, a stencil screen carried thereby, said frame being capable of reciprocation in a horizontal plane from one extreme position to another, a relatively stationary squeegee in contact with said screen, an article carriage pivotally mounted in the apparatus for swinging movement toward and away from said screen, means for rotatably supporting an article on said carriage, means for releasably supporting said carriage in a position wherein the article supported thereby is in contact with said screen, and automatic means operable upon approach of said stencil screen frame to one or the other of its extreme positions for releasing said carriage.

8. A stenciling apparatus comprising a stencil screen frame, a stencil screen carried thereby, said frame being capable of reciprocation in a horizontal plane from one extreme position to another, a stationary squeegee in contact with said screen, an article carriage positioned beneath said screen, means for rotatably supporting an article on said carriage, said carriage being movable from an elevated position with the article thereon in contact with said screen to a lowered position with the article exposed to facilitate substitution thereof, means for releasably supporting said carriage in elevated position, and automatic means operable upon approach of said stencil screen frame to one or the other of its extreme positions for releasing said carriage.

9. A stenciling apparatus comprising a stencil screen carriage, a stencil screen carried thereby, said carriage being movable in a horizontal plane from one extreme position to another, a stationary squeegee in contact with said screen, an article support positioned beneath said screen, means for rotatably supporting an article on said support, said support being movable by the action of gravity from an elevated position with the article thereon in contact with said screen to a lowered position with the article out of contact therewith, a member positioned in the path of movement of said support for maintaining said support in its elevated position, and means operable upon movement of said carriage toward one or the other of its extreme positions for moving said member out of the path of said support to permit said support to drop by the action of gravity to said lowered position.

10. A stenciling apparatus comprising a horizontally disposed track, a stencil screen frame slidable on said track for reciprocation from one end thereof to the other, a stencil screen carried by said frame, an article supporting carriage positioned beneath said frame, means for rotatably supporting an article on said carriage, said carriage being movable from an elevated position with the article thereon in rolling contact with said screen to a lowered position with the article out of contact therewith, means for releasably supporting said carriage in its elevated position, a trip member for releasing said carriage, said trip member projecting into the path of movement of said frame and being adapted to be actuated upon contact with said frame.

11. A stenciling apparatus comprising a horizontally disposed track, a stencil screen frame slidable on said track for reciprocation from one end thereof to the other, a stencil screen carried by said frame, an article supporting carriage positioned beneath said frame, means for rotatably supporting an article on said carriage, said carriage being movable from an elevated position with the article thereon in rolling contact with said screen to a lowered position with the article out of contact therewith, a latch engaging arm on said carriage, a pivoted latch normally engaging said arm to maintain said carriage in elevated position, a latch operated arm carried by said latch, and means projecting into the path of movement of said frame and adapted to be engaged thereby for actuating said latch operating arm to remove said latch from engagement with said latch engaging arm.

12. In an apparatus for decorating articles having cylindrical or frusto-conical surfaces, a stencil screen, means for positioning an article with the surface thereof to be decorated in tangential rolling line-contact with said screen, a squeegee normally in contact with the screen, said squeegee being movable from an off-center position on one side of the line of contact between the screen and surface to an off-center position on the other side of the line, and adjustable means for limiting the extent of said off-center positions.

HENRY W. SCHNEIDER.